US008326092B2

(12) United States Patent
Chung et al.

(10) Patent No.: US 8,326,092 B2
(45) Date of Patent: *Dec. 4, 2012

(54) HETEROGENEOUS IMAGE PROCESSING SYSTEM

(75) Inventors: William H. Chung, Cortlandt Manor, NY (US); Moon J. Kim, Wappingers Falls, NY (US); James R. Moulic, Poughkeepsie, NY (US); Toshiyuki Sanuki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 638 days.

This patent is subject to a terminal disclaimer.

(21) Appl. No.: 11/738,723

(22) Filed: Apr. 23, 2007

(65) Prior Publication Data

US 2008/0260297 A1     Oct. 23, 2008

(51) Int. Cl.
    *G06K 9/60* (2006.01)
(52) U.S. Cl. ........ 382/307; 345/522; 345/557; 348/139; 382/154; 382/276; 382/284; 701/31.4; 709/201; 712/226; 725/9
(58) Field of Classification Search ................. None
    See application file for complete search history.

(56) References Cited

U.S. PATENT DOCUMENTS

| | | | |
|---|---|---|---|
| 4,517,593 A * | 5/1985 | Keller et al. ................. | 348/139 |
| 4,893,188 A | 1/1990 | Murakami et al. | |
| 5,136,662 A | 8/1992 | Maruyama et al. | |
| 5,506,999 A | 4/1996 | Skillman et al. | |
| 5,621,811 A | 4/1997 | Roder | |
| 5,659,630 A | 8/1997 | Forslund | |
| 5,721,883 A | 2/1998 | Katsuo et al. | |
| 5,809,078 A | 9/1998 | Tani et al. | |
| 5,956,081 A * | 9/1999 | Katz et al. ................. | 348/163 |
| 6,023,637 A | 2/2000 | Liu et al. | |
| 6,025,854 A | 2/2000 | Hnz et al. | |
| 6,081,659 A | 6/2000 | Garza et al. | |
| 6,166,373 A | 12/2000 | Mao | |
| 6,215,898 B1 * | 4/2001 | Woodfill et al. ............. | 382/154 |
| 6,404,902 B1 | 6/2002 | Takano et al. | |
| 6,456,737 B1 | 9/2002 | Woodfill et al. | |
| 6,487,619 B1 | 11/2002 | Takagi | |

(Continued)

FOREIGN PATENT DOCUMENTS

EP     1345120 A2     9/2003

(Continued)

OTHER PUBLICATIONS

Kim et al., U.S. Appl. No. 11/940,506, Office Action Communication, Nov. 2, 2009, 20 pages.

(Continued)

*Primary Examiner* — Tsung-Yin Tsai
(74) *Attorney, Agent, or Firm* — Hoffman Warnick LLC; William E. Schiesser (57) ABSTRACT

The present invention relates to machine vision computing environments, and more specifically relates to a system and method for selectively accelerating the execution of image processing applications using a hybrid computing system. To this extent, a hybrid system is generally defined as one that is multi-platform, and potentially distributed via a network or other connection. The invention provides a machine vision system and method for executing image processing applications on a hybrid image processing system referred to herein as an image co-processor that comprises (among other things) a plurality of special purpose engines (SPEs) that work to process multiple images in an accelerated fashion.

27 Claims, 5 Drawing Sheets

U.S. PATENT DOCUMENTS

| | | | |
|---|---|---|---|
| 6,549,992 | B1 | 4/2003 | Armangau et al. |
| 6,567,622 | B2 | 5/2003 | Phillips |
| 6,647,415 | B1 | 11/2003 | Olarig et al. |
| 6,661,931 | B1* | 12/2003 | Kawada ............... 382/276 |
| 6,671,397 | B1 | 12/2003 | Mahon et al. |
| 6,744,931 | B2* | 6/2004 | Komiya et al. ............ 382/284 |
| 6,825,943 | B1 | 11/2004 | Barry et al. |
| 6,829,378 | B2 | 12/2004 | DiFilippo et al. |
| 6,898,634 | B2 | 5/2005 | Collins et al. |
| 6,898,670 | B2 | 5/2005 | Nahum |
| 6,950,394 | B1 | 9/2005 | Chou et al. |
| 7,000,145 | B2 | 2/2006 | Werner et al. |
| 7,016,996 | B1 | 3/2006 | Schober |
| 7,043,745 | B2* | 5/2006 | Nygren et al. ............... 725/9 |
| 7,065,618 | B1 | 6/2006 | Ghemawat et al. |
| 7,076,569 | B1 | 7/2006 | Bailey et al. |
| 7,095,882 | B2 | 8/2006 | Akahori |
| 7,102,777 | B2 | 9/2006 | Haraguchi |
| 7,106,895 | B1 | 9/2006 | Goldberg et al. |
| 7,142,725 | B2 | 11/2006 | Komiya et al. |
| 7,171,036 | B1* | 1/2007 | Liu et al. ............... 382/145 |
| 7,225,324 | B2* | 5/2007 | Huppenthal et al. ......... 712/226 |
| 7,243,116 | B2 | 7/2007 | Suzuki et al. |
| 7,299,322 | B2 | 11/2007 | Hosouchi et al. |
| 7,327,889 | B1 | 2/2008 | Imai et al. |
| 7,430,622 | B1 | 9/2008 | Owen |
| 7,480,441 | B2 | 1/2009 | Klausberger et al. |
| 7,523,148 | B2 | 4/2009 | Suzuki et al. |
| 7,602,394 | B2 | 10/2009 | Seki et al. |
| 7,605,818 | B2 | 10/2009 | Nagao et al. |
| 7,743,087 | B1* | 6/2010 | Anderson et al. ............ 709/201 |
| 7,801,895 | B2 | 9/2010 | Hepper et al. |
| 8,078,837 | B2 | 12/2011 | Kajihara |
| 8,094,157 | B1 | 1/2012 | Le Grand |
| 2002/0002636 | A1 | 1/2002 | Vange et al. |
| 2002/0129216 | A1 | 9/2002 | Collins |
| 2002/0164059 | A1 | 11/2002 | DiFilippo et al. |
| 2002/0198371 | A1 | 12/2002 | Wang |
| 2003/0023154 | A1 | 1/2003 | Nitz |
| 2003/0053118 | A1 | 3/2003 | Muramoto et al. |
| 2003/0092980 | A1 | 5/2003 | Nitz |
| 2003/0113034 | A1 | 6/2003 | Komiya et al. |
| 2004/0024810 | A1 | 2/2004 | Choubey et al. |
| 2004/0062265 | A1 | 4/2004 | Poledna |
| 2004/0062454 | A1 | 4/2004 | Komiya et al. |
| 2004/0091243 | A1* | 5/2004 | Theriault et al. ............... 386/52 |
| 2004/0122790 | A1 | 6/2004 | Walker et al. |
| 2004/0143631 | A1 | 7/2004 | Banerjee et al. |
| 2004/0153751 | A1 | 8/2004 | Marshal et al. |
| 2004/0156546 | A1 | 8/2004 | Kloth |
| 2004/0170313 | A1 | 9/2004 | Nakano et al. |
| 2004/0186371 | A1 | 9/2004 | Toda |
| 2004/0217956 | A1 | 11/2004 | Besl et al. |
| 2004/0228515 | A1 | 11/2004 | Okabe et al. |
| 2004/0233036 | A1 | 11/2004 | Sefton |
| 2004/0252467 | A1 | 12/2004 | Dobbs et al. |
| 2005/0013960 | A1 | 1/2005 | Ozeki et al. |
| 2005/0022038 | A1 | 1/2005 | Kaushik et al. |
| 2005/0044132 | A1 | 2/2005 | Campbell et al. |
| 2005/0063575 | A1 | 3/2005 | Ma et al. |
| 2005/0080928 | A1 | 4/2005 | Beverly et al. |
| 2005/0083338 | A1 | 4/2005 | Yun et al. |
| 2005/0084137 | A1 | 4/2005 | Kim et al. |
| 2005/0093990 | A1 | 5/2005 | Aoyama |
| 2005/0113960 | A1 | 5/2005 | Karau et al. |
| 2005/0219253 | A1* | 10/2005 | Piazza et al. ............... 345/557 |
| 2005/0259866 | A1 | 11/2005 | Jacobs et al. |
| 2005/0263678 | A1 | 12/2005 | Arakawa |
| 2006/0013473 | A1 | 1/2006 | Woodfill et al. |
| 2006/0117238 | A1 | 6/2006 | DeVries et al. |
| 2006/0135117 | A1 | 6/2006 | Laumen et al. |
| 2006/0149798 | A1 | 7/2006 | Yamagami |
| 2006/0171452 | A1* | 8/2006 | Waehner ............... 375/240.01 |
| 2006/0184296 | A1* | 8/2006 | Voeller et al. ............... 701/33 |
| 2006/0190627 | A1 | 8/2006 | Wu et al. |
| 2006/0235863 | A1 | 10/2006 | Khan |
| 2006/0239194 | A1 | 10/2006 | Chapell |
| 2006/0250514 | A1 | 11/2006 | Inoue et al. |
| 2006/0268357 | A1 | 11/2006 | Vook et al. |
| 2006/0269119 | A1 | 11/2006 | Goldberg et al. |
| 2006/0274971 | A1 | 12/2006 | Kumazawa et al. |
| 2006/0279750 | A1 | 12/2006 | Ha |
| 2007/0126744 | A1 | 6/2007 | Tsutsumi |
| 2007/0159642 | A1 | 7/2007 | Choi |
| 2007/0245097 | A1 | 10/2007 | Gschwind et al. |
| 2007/0250519 | A1 | 10/2007 | Fineberg et al. |
| 2008/0013862 | A1 | 1/2008 | Isaka et al. |
| 2008/0036780 | A1* | 2/2008 | Liang et al. ............... 345/522 |
| 2008/0063387 | A1 | 3/2008 | Yahata et al. |
| 2008/0092744 | A1 | 4/2008 | Storbo et al. |
| 2008/0129740 | A1 | 6/2008 | Itagaki et al. |
| 2008/0140771 | A1 | 6/2008 | Vass et al. |
| 2008/0144880 | A1 | 6/2008 | DeLuca |
| 2008/0147781 | A1 | 6/2008 | Hopmann et al. |
| 2008/0177964 | A1 | 7/2008 | Takahashi et al. |
| 2008/0259086 | A1 | 10/2008 | Doi et al. |
| 2008/0260297 | A1 | 10/2008 | Chung et al. |
| 2008/0263154 | A1 | 10/2008 | Van Datta |
| 2008/0270979 | A1* | 10/2008 | McCool et al. ............... 717/108 |
| 2009/0003542 | A1 | 1/2009 | Ramanathan et al. |
| 2009/0052542 | A1* | 2/2009 | Romanovskiy et al. . 375/240.24 |
| 2009/0066706 | A1* | 3/2009 | Yasue et al. ............... 345/505 |
| 2009/0074052 | A1* | 3/2009 | Fukuhara et al. ......... 375/240.01 |
| 2009/0083263 | A1* | 3/2009 | Felch et al. ............... 707/5 |
| 2009/0089462 | A1 | 4/2009 | Strutt |
| 2009/0150555 | A1 | 6/2009 | Kim et al. |
| 2009/0150556 | A1 | 6/2009 | Kim et al. |
| 2009/0187654 | A1 | 7/2009 | Raja et al. |
| 2009/0265396 | A1 | 10/2009 | Ram et al. |
| 2010/0060651 | A1* | 3/2010 | Gala ............... 345/506 |

FOREIGN PATENT DOCUMENTS

| | | |
|---|---|---|
| WO | 0068884 A1 | 4/2000 |
| WO | 0068884 | 11/2000 |

OTHER PUBLICATIONS

Kim et al., U.S. Appl. No. 11/951,709, Office Action Communication, Nov. 17, 2009, 20 pages.

Kim et al., U.S. Appl. No. 11/951,712, Office Action Communication, Sep. 9, 2009, 26 pages.

Kim et al., U.S. Appl. No. 11/940,470, Office Action Communication, Nov. 18, 2009, 31 pages.

PCT Search Report, International Application No. PCT/EP2008/054331, Oct. 4, 2008, 10 pages.

Kim et al., U.S. Appl. No. 11/940,470, Office Action Communication, Jun. 9, 2010, 26 pages.

Kim et al., U.S. Appl. No. 11/951,709, Office Action Communication, May 14, 2010, 24 pages.

Kim et al., U.S. Appl. No. 11/940,506, Office Action Communication, May 14, 2010, 16 pages.

Patent Cooperation Treaty, International Application No. PCT/EP2008/054331, Filed Oct. 4, 2008, International Search Report and Written Opinion of the International Searching Authority, Jul. 28, 2008, 10 pages.

Chung et al., U.S. Appl. No. 11/738,711, Office Action Communication, Jun. 25, 2010, 26 pages.

Kim et al., U.S. Appl. No. 11/951,712, Office Action Communication, Jul. 23, 2010, 25 pages.

Do, U.S. Appl. No. 11/668,875, Notice of Allowance & Fees Due, Aug. 13, 2010, 9 pages.

Do, U.S. Appl. No. 11/668,875, Notice of Allowance & Fees Due, Sep. 20, 2010, 8 pages.

Ansari, U.S. Appl. No. 11/940,506, Office Action Communication, Oct. 29, 2010, 21 pages.

Tsai, U.S. Appl. No. 11/738,711, Office Action Communication, Nov. 9, 2010, 13 pages.

Yang, U.S. Appl. No. 11/767,728, Office Action Communication, Nov. 19, 2010, 25 pages.

Yang, U.S. Appl. No. 11/877,926, Office Action Communication, Nov. 22, 2010, 33 pages.

Chambers, U.S. Appl. No. 11/951,709, Office Action Communication, Nov. 29, 2010, 21 pages.

Tiv, U.S. Appl. No. 11/951,712, Office Action Communication, Jan. 5, 2011, 18 pages.
Cosby, U.S. Appl. No. 11/940,470, Office Action Communication, Nov. 26, 2010, 19 pages.
Eveno, PCT / EP2008 / 050443, International Search Report, Jul. 22, 2008, 5 pages.
Cussac, PCT / EP2008 / 050443, PCT International Preliminary Report on Patentability, Aug. 4, 2009, 8 pages.
Kuhnen, PCT / EP2008 / 050443, Invitation to Pay Additional Fees, Apr. 25, 2008, 6 pages.
Tsung Yin Tsai, U.S. Appl. No. 11/738,711, Office Action Communication, Feb. 18, 2011, 17 pages.
Cosby, Lawrence V., U.S. Appl. No. 11/940.470, Office Action Communication, Mar. 4, 2011, 22 pages.
Yang, Qian, U.S. Appl. No. 11/877,926, Office Action Communication, Mar. 23, 2011, 32 pages.
Bitar, Nancy, U.S. Appl. No. 11/782,170, Office Action Communication, Mar. 17, 2011, 19 pages.
Yang, Qian, U.S. Appl. No. 11/767,728, Office Action Communication, Mar. 15, 2011, 34 pages.
Yang, U.S. Appl. No. 11/767,728, Office Action Communication, Jul. 28, 2011, 32 pages.
Tiv, U.S. Appl. No. 11/951,712, Office Action Communication, Apr. 26, 2011, 20 pages.
Tsai, U.S. Appl. No. 11/738,711, Office Action Communication, May 23, 2011, 16 pages.
Yang, U.S. Appl. No. 11/767,728, Office Action Communication, Feb. 16, 2012, 33 pages.
Bitar, U.S. Appl. No. 11/782,170, Notice of Allowance and Fees Due, Feb. 21, 2012, 20 pages.
Entezari, U.S. Appl. No. 12/028,073, Notice of Allowance & Fees Due, Mar. 21, 2012, 18 pages.
Yang, U.S. Appl. No. 11/767,728, Office Action Communication, Oct. 28, 2011, 33 pages.
Tsai, U.S. Appl. No. 11/738,711, Office Action Communication, Nov. 4, 2011, 14 pages.
Entezari, U.S. Appl. No. 12/028,073, Office Action Communication, Dec. 2, 2011, 51 pages.
Yang, U.S. Appl. No. 11/877,926, Office Action Communication, Jan. 4, 2012, 40 pages.
Bitar, U.S. Appl. No. 11/782,170, Office Action Communication, Sep. 16, 2011, 21 pages.
Tsai, U.S. Appl. No. 11/738,711, Office Action Communication, Sep. 23, 2011, 20 pages.
Tiv, U.S. Appl. No. 11/951,712, Office Action Communication, Oct. 21, 2011, 27 pages.
Yang, U.S. Appl. No. 11/877,926, Office Action Communication, END920070398US1, Apr. 27, 2012, 32 pages.
Yang, U.S. Appl. No. 11/767,728, Office Action Communication, END920070110US2, May 21, 2012, 49 pages.
Tsai, U.S. Appl. No. 11/738,711, Notice of Allowance & Fees Due, END920070111US1, May 25, 2012, 5 pages.
Kim, U.S. Appl. No. 12/057,942, Office Action Communication, END920080092US1, Jun. 7, 2012, 58 pages.
Yang, Application No. 11/767,728, Office Action Communication, END920070110US2, Aug. 10, 2012, 41 pages.
Yang, Application No. 11/877,926, Office Action Communication, END920070398US1, Aug. 10, 2012, 47 pages.

\* cited by examiner

PRIOR ART

HETEROGENEOUS IMAGE PROCESSING SYSTEM

CROSS-REFERENCE TO RELATED APPLICATION

This application is related in some aspects to commonly owned U.S. patent application Ser. No. 11/738,711 entitled "HETEROGENEOUS IMAGE PROCESSING SYSTEM", filed concurrently herewith, the entire contents of which are herein incorporated by reference.

FIELD OF THE INVENTION

In general, the present invention relates to image processing/inspection. Specifically, the present invention relates to a heterogeneous image processing system that provides accelerated image processing as compared to previous approaches.

BACKGROUND OF THE INVENTION

Current image processing/inspection systems have limited processing power. Specifically, current systems perform all image processing functions within a single, general-purpose system. The processor used in current image processing/inspection systems is not powerful enough to handle the image processing demands, data rates, and algorithms for much of the current generation of (e.g., manufacturing inspection systems), let alone the next generation of systems. Next-generation manufacturing systems have a need for a fast image processing system in order to complete image inspection within required times. As the size of the inspection area and the amount of gray scale data double, the data per one scan area increases dramatically. Therefore, the image inspection processing time is drastically increased. Thus, the current inspection system(s) will not adequately handle the requirements for future manufacturing systems.

Figure 1:
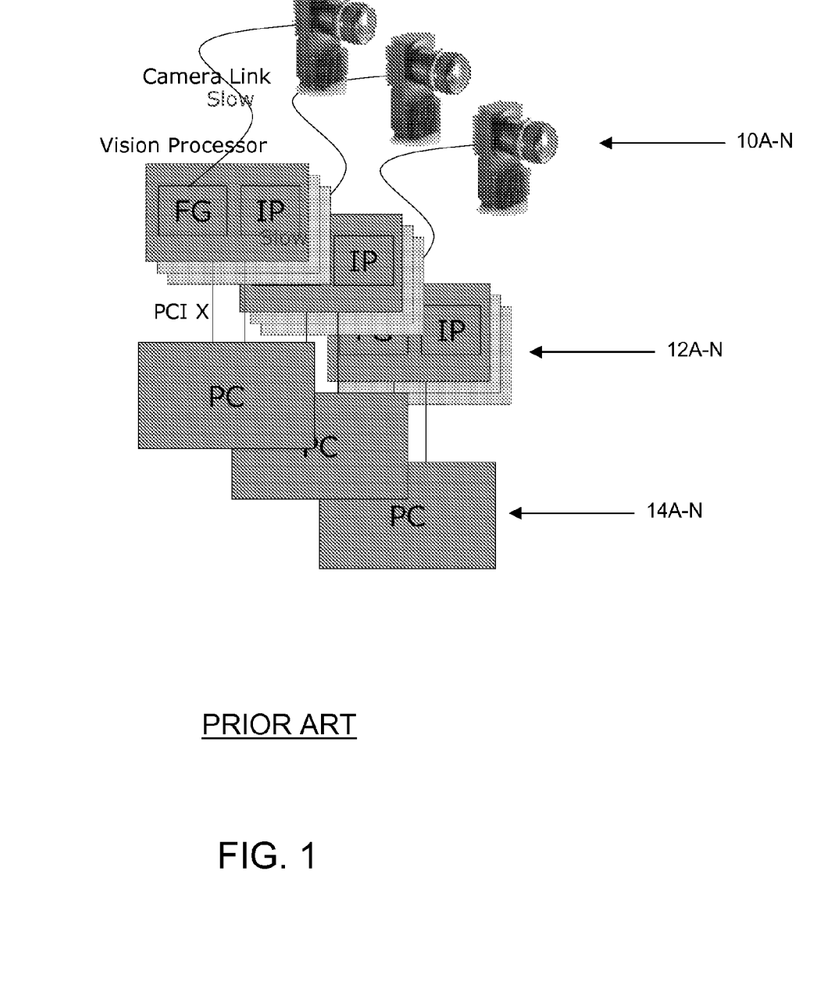
FIG. 1 shows a system for processing images according to the related art.

Although, image processing functions are sometimes offloaded to another system, this other system also uses a general purpose processor that fails to actually perform any image processing acceleration. In addition, image processing functions in current systems are tied to a specific processor and platform, making it difficult to offload and accelerate specific functions at a fine-grained level. An example of this is shown in FIG. 1. Specifically, as shown, each image recording device (e.g., camera) 10A-N is linked with a separate and distinct (general purpose) processor 12A-N, that itself is linked/integrated with a separate and distinct node 14A-N (e.g., PC). Such an embodiment fails to provide the accelerated image processing needed by current and emerging image generations.

Whereas the development of a new inspection system will increase cost and development time, it is desirable to use reusable system components without impacting system performance. In view of the foregoing, there exists a need for an approach that solves at least one of the above-referenced deficiencies of the current art.

SUMMARY OF THE INVENTION

In general, the present invention relates to machine vision computing environments, and more specifically relates to a system and method for accelerating the execution of image processing applications using a hybrid computing system. To this extent, a hybrid system is generally defined as one that is multi-platform, and potentially distributed via a network or other connection. The invention provides a machine vision system and method for executing image processing applications on a hybrid image processing system referred to herein as an image co-processor that comprises (among other things) a plurality of special purpose engines (SPEs) that work collectively to process multiple images in an accelerated fashion. Moreover, implementations of the invention provide a machine vision system and method for distributing and managing the execution of image processing applications at a fine-grained level via a switch-connected hybrid system. This method allows one system to be used to manage and control the system functions, and one or more other systems to execute image processing applications. The invention allows the management and control system components to be reused, and the image processing components to be used as an image processing accelerator or image co-processor. The system components can be run using different operating systems, such as Windows (Windows and related terms are trademarks of Microsoft Corp. in the United States and/or other countries), Linux (Linux and related terms are trademarks of Linus Torvalds in the United States and/or other countries), Macintosh (Macintosh and related terms are trademarks of Apple Inc. in the United States and/or foreign countries), etc.

Along these lines, the present invention improves upon existing systems by providing a hybrid system comprising a management processor; a general purpose processor, a set (e.g., one or more) of special purpose engines/accelerators; a closely connected network, a staging storage device; and an archive storage device.

The present invention further provides a multi-platform hybrid system that reuses uses the existing infrastructure including the software assets for the image processing/inspection management and control system, and offloads image processing workloads to a special-purpose accelerator Further provided is a method for processing image(s), comprising: receiving a request for execution of an image co-processor of an application; and analyzing switches and routing at least a portion of library functions of the image(s)

Still yet, an image processing program product stored on a computer readable medium is provided that furnishes: a set (e.g., one or more) of libraries with selective offload of functions, algorithms, and optimizations to other systems; scalable processing system design(s) that increase and decrease processors when needed; multiple hybrid platform system design(s); and optimizations encapsulated in pluggable modules.

A first aspect of the present invention provides a heterogeneous image processing system, comprising: an image co-processor comprising a plurality of special purpose engines (SPEs), the plurality of SPEs being configured to: receive a plurality of images; and process the plurality of images to determine associated image data.

A second aspect of the present invention provides a heterogeneous image processing method, comprising: receiving a plurality of images in an image co-processor, the image co-processor comprising a plurality of special purpose engines (SPEs); processing the plurality of images with the plurality of SPEs to determine image data associated with the plurality of images; and providing at least one of the image data or the plurality of images to a control processor to determine control information associated with the plurality of images.

A third aspect of the present invention provides a program product stored on computer readable medium for heterogeneously processing an image, the computer readable medium comprising program code for causing a computer system to: receive a plurality of images in an image co-processor, the image co-processor comprising a plurality of special purpose engines (SPEs); and process the plurality of images with the plurality of SPEs to determine image data associated with the plurality of images.

A fourth aspect of the present invention provides a method for deploying a system for heterogeneously processing an image, comprising: providing a computer infrastructure being operable to: receive a plurality of images in an image co-processor, the image co-processor comprising a plurality of special purpose engines (SPEs); and process the plurality of images with the plurality of SPEs to determine image data associated with the plurality of images.

A fifth aspect of the present invention provides computer software embodied in a propagated signal for heterogeneously processing an image, the computer software comprising instructions for causing a computer system to: receive a plurality of images in an image co-processor, the image co-processor comprising a plurality of special purpose engines (SPEs); and process the plurality of images with the plurality of SPEs to determine image data associated with the plurality of images.

A sixth aspect of the present invention provides a data processing system for heterogeneously processing an image, comprising a memory medium comprising instructions; a bus coupled to the memory medium; and a processor coupled to the bus that when executing the instruction causes the data processing system to: receive a plurality of images in an image co-processor, the image co-processor comprising a plurality of special purpose engines (SPEs); and process the plurality of images with the plurality of SPEs to determine image data associated with the plurality of images.

A seventh aspect of the present invention provides computer-implemented business method for heterogeneously processing an image, comprising: receiving a plurality of images in an image co-processor, the image co-processor comprising a plurality of special purpose engines (SPEs); and processing the plurality of images with the plurality of SPEs to determine image data associated with the plurality of images.

An eighth aspect of the present invention provides a heterogeneous image processing system, comprising: an image co-processor comprising: a set of input/output (I/O) processors; a set of multi-core processors (MCPs) coupled to the set of I/O processors; a set of external data representation (XDR) modules coupled to the set of MCPs; and a set of express peripheral component interconnects (PCIs) coupled the set of I/O processors, at lease one of the set of express PCIs receiving image data from a PC system that is external to the image co-processor.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention relates to machine vision computing environments, and more specifically relates to a system and method for selectively accelerating the execution of image processing applications using a hybrid computing system. To this extent, a hybrid system is generally defined as one that is multi-platform, and potentially distributed via a network or other connection. The invention provides a machine vision system and method for executing image processing applications on a hybrid image processing system referred to herein as an image co-processor (also referred to herein as a "cell") that comprises (among other things) a plurality of special purpose engines (SPEs) that work to process multiple images in an accelerated fashion. Moreover, implementations of the invention provide a machine vision system and method for distributing and managing the execution of image processing applications at a fine-grained level via a switch-connected hybrid system. This method allows one system to be used to manage and control the system functions, and one or more other systems to execute image processing applications. The invention allows the management and control system components to be reused, and the image processing components to be used as an image processing accelerator or image co-processor. The system components can be run using different operating systems, such as Windows (Windows and related terms are trademarks of Microsoft Corp. in the United States and/or other countries), Linux (Linux and related terms are trademarks of Linus Torvalds in the United States and/or other countries), Macintosh (Macintosh and related terms are trademarks of Apple Computer Inc. in the United States and/or other countries), etc.

Figure 2:
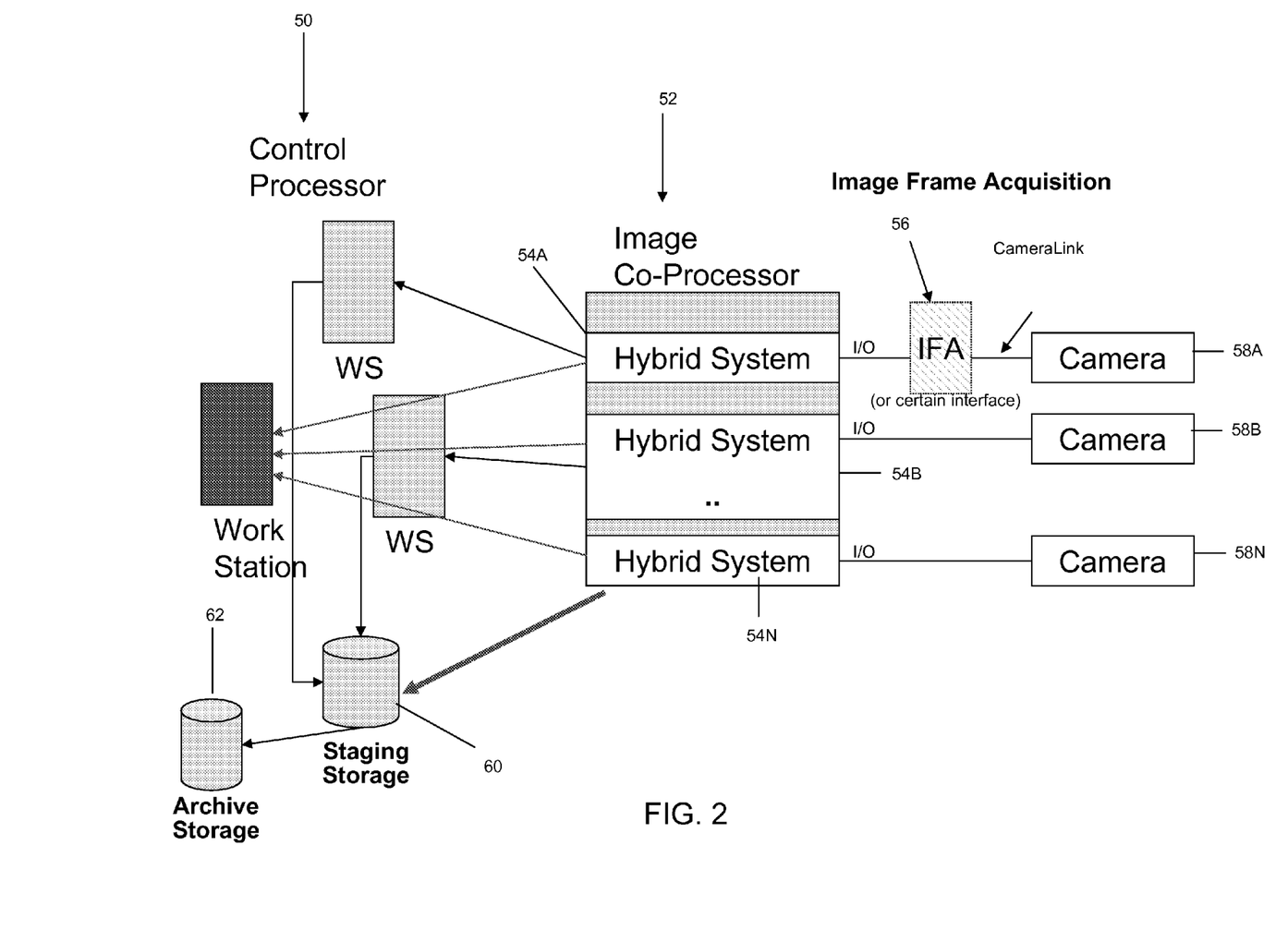
FIG. 2 shows a heterogeneous, hybrid image processing/inspection system according to the present invention.

Referring now to FIG. 2, a heterogeneous image processing/inspection system according to the present invention is shown. As depicted, image recordation mechanisms (e.g., cameras) 58A-N record images and are attached to an image co-processor 52 (via one more image frame acquisition mechanisms 56 for image processing). The image co-processor 52 in turn is connected to a control processor 50. These components are connected in a single, monolithic, tightly integrated system. All image processing is done completely within the single system. Each component can only be used with a limited set of other components. Each component, and thus the entire system, can only run a single operating system. The current image inspection system can be used in a manufacturing line to detect defects in items such as LCD panels or semiconductor wafers. The system performs one or more scans to detect defect points. Image analysis is conducted on a magnified version of each defect point. A single Field of View (FOV) has multiple inspection threads, which run different algorithms, potentially at the same time for different areas in an image. One algorithm may take significantly longer to run than others. Image processing software libraries are used to implement the algorithms. Large amounts of image and log data need to be moved, processed, and stored during inspection, requiring high I/O speeds and bandwidth.

This new design approach is a processing/inspection system based on hybrid, reusable components/systems 54A-N that are combined with special purpose engines/accelerators. Image processing applications use algorithms that often have specialized functions that can benefit from special purpose processors. These special purpose processors can be used as accelerators to speed up image processing algorithms in a fine-grained, selective fashion that takes advantage of the strengths of both general purpose and special purpose processors. Thus, the present invention, combines image recording mechanisms/devices 58A-N such as cameras with a special purpose processor for image processing as well as a general processor 50 for determining control information.

In a typical embodiment, images are received by hybrid systems 54A-N of image co-processor 52, which process the images to determine image data. This image data (and optionally the images themselves) are then communicated to control processor 50 and staging storage unit 60. Control processor then processes the image data to determine control information. The images, image data, and/or control information can then be stored in archive storage unit 62.

Figure 3:
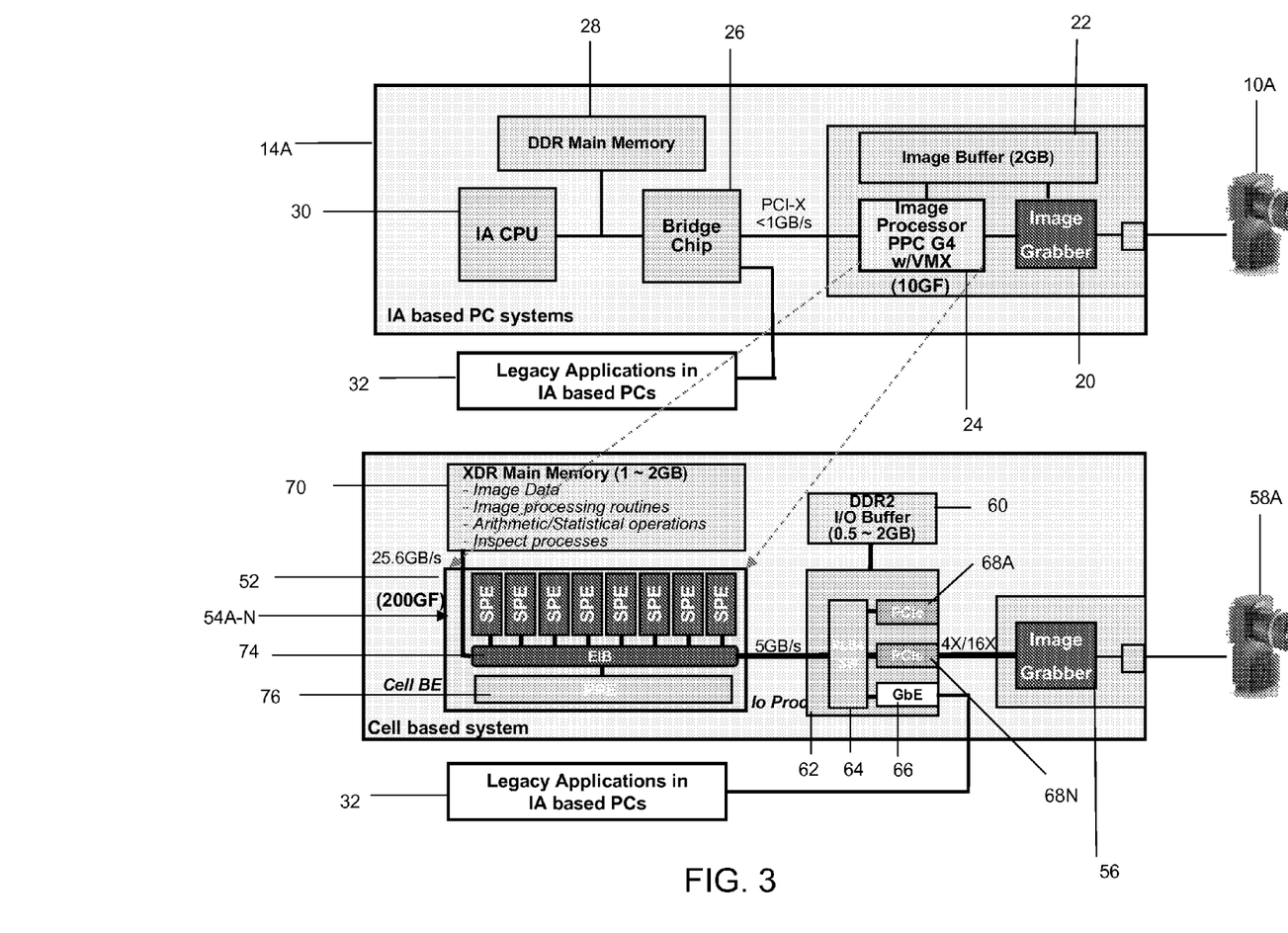
FIG. 3 shows an approach for integrating the system of FIG. 2 with an existing system according to the present invention.

Referring now to FIG. 3, a more detailed diagram of the system of the present invention as well as its integration with existing system is shown in greater detail. As depicted, image grabber 56 acquires images from one or more image recordation mechanisms 58A and passes the image(s) to an input/output (I/O) processor 62. As depicted I/O processor 62 generally includes a set of express peripheral component interconnects (PCIs) 68A-N, a pure load balancer (PLB) 64 coupled to the set of express PCIs 68A-N; and a network interface 66 (e.g., GbE) coupled to the PLB 64 for interfacing with at least one legacy application 32 in IA-based PC 14A. An I/O buffer 60 is also shown coupled to the I/O processor 62.

Further shown within image co-processor 52 is a power processing element (PPE) 76, an element interconnect bus (EIB) 74 coupled to the PPE, and a set (e.g., one or more) but typically a plurality of special purpose engines (SPEs) 54A-N. SPEs 54A-N share the load involved with processing image(s) into image data. The division of work among SPEs 54A-N was not previously performed, and hence, previous system are not suitable for current day and future image technology. As further shown, SPEs 54A-N feed image data, image processing routines, arithmetic/statistical operations, inspect processes, etc. to main memory 70 (which could be realized as staging storage unit 60 of FIG. 2.). Image co-processor 52 will leverage legacy application in IA-based PC 14A to have general purpose or control processor 24 process the image or image data to determine control information.

As further depicted, IA-based PC system 14A of the related art obtains an image from image recordation mechanism 10A via image grabber 20, and passes the image to a general purpose image processor 24 for processing (e.g., utilizing image buffer 22). This sparsely processed image data is then passed to bridge chip 26, IA CPU 30, and (DDR) main memory 28. As can be seen, the previous system utilizes only a single general-purpose processor to process the image. Whereas, the present invention utilizes an image co-processor having a plurality of SPEs 54A-N as well as general purpose control processor 24 of IA-based PC system 14A. This is accomplished by communicated through legacy application(s) 32 in IA-based PC system 14A. Thus, the present invention not only provides improved and accelerated image processing, but it does so by utilizing existing infrastructure. It should be noted that the heterogeneous image processing system of the present invention is operable with multiple different computing platforms (e.g., Windows, Linux, etc.).

Figure 4:
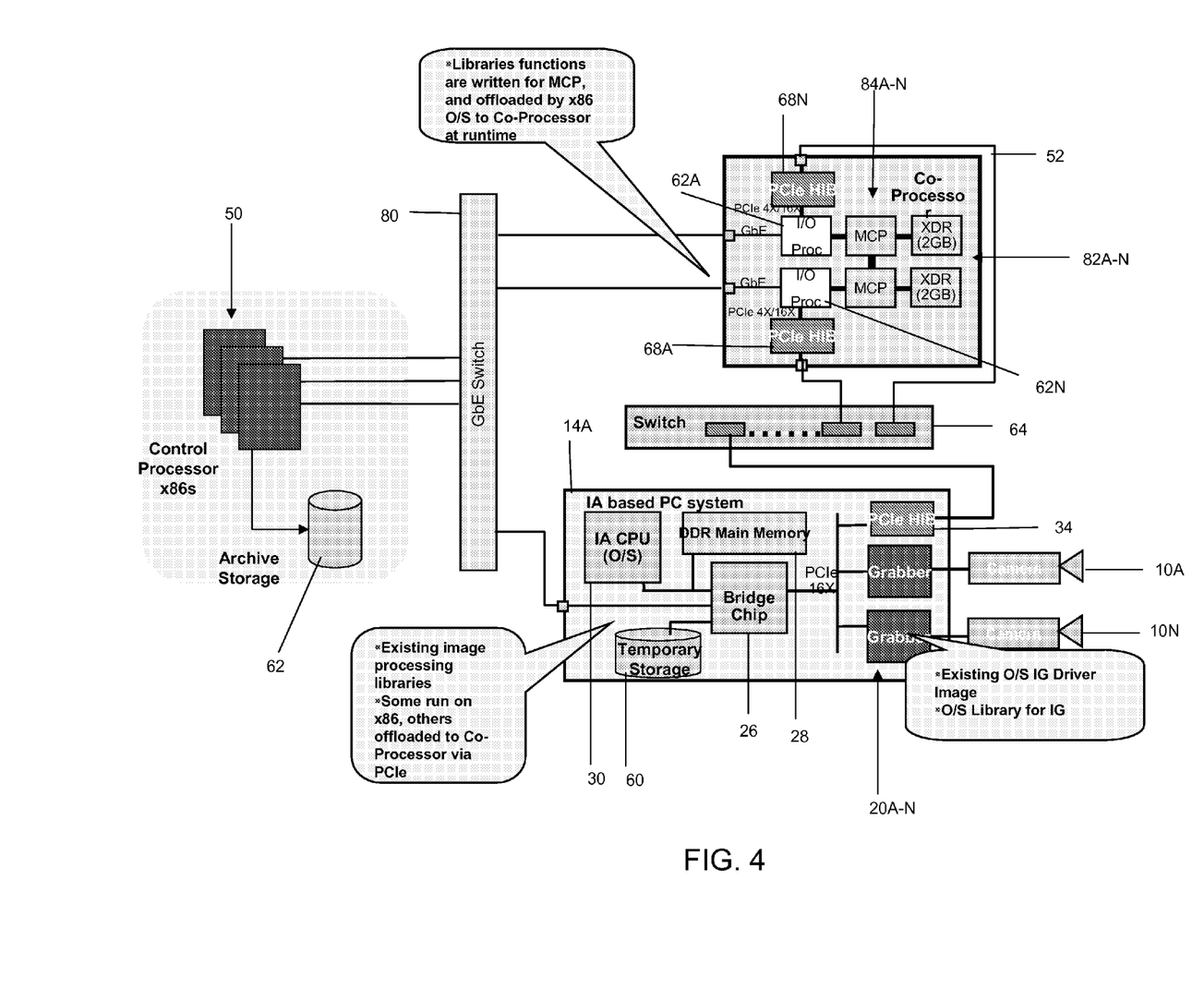
FIG. 4 shows an approach for a heterogeneous, hybrid image processing/inspection system having parallel processors according to the present invention.

FIG. 4 shows another embodiment of the present invention. Specifically, FIG. 4 depicts the convergence of a host machine with PCI express to accommodate in multiple image grabbers 20A-N in IA-based PC system 14A, as well as parallel multi-core processors (MCPs) 84A-N within in image co-processor 52 (MCPs 84A-N can be media communications processors, which are a type of processor specifically designed for the creation and distribution of digital media/content.). Specifically, image recordation mechanisms 10A-N will capture images and feed the same to separate image grabbers 20A-N, which utilize existing O/S image grabber driver images and an existing O/S library for image grabbers 20A-N. Then, using PCI express host interface board (PCIe HIB 34), the image is communicated to bridge chip 26 for processing and placement in temporary/staging storage unit 60. As further shown, bridge chip 26 is coupled to (DDR) main memory 28 and IA CPU 30. Switch 64 couples IA-based PC system 14A to image co-processor 52 via PCIe HIBs 34 and 68A. As shown, image co-processor includes parallel PCIe HIBs 68A-N, I/O processors 62A-N, MCPs 84A-N, and external data representation (XDR) modules 82A-N. A gigabit Ethernet (GbE) network interface and switch 80 can then be used to couple image co-processor 52 and IA-based PC system 14A to control processor 50, and archive storage 62. As further shown in FIG. 4, library functions are written for MCPs 84A-N and off-loaded by (e.g., x86) O/S to image co-processor 52 at runtime.

Along these lines, the library developed for the present invention typically has at least one of the following features (among others):

(1) It is typically structured as a reusable library with many useful functions and algorithms available.

(2) It is useable cross-platform (Windows, Linux, Mac).

(3) It is optimized for a specific processor architecture, but optimizations are encapsulated in a separate library. Architecture supports plugging in of other optimized libraries, such as one for cell.

(4) It includes wrappers for scripting languages such as Python, and graphical user interfaces (GUIs) to make rapid prototyping easier.

Figure 5:
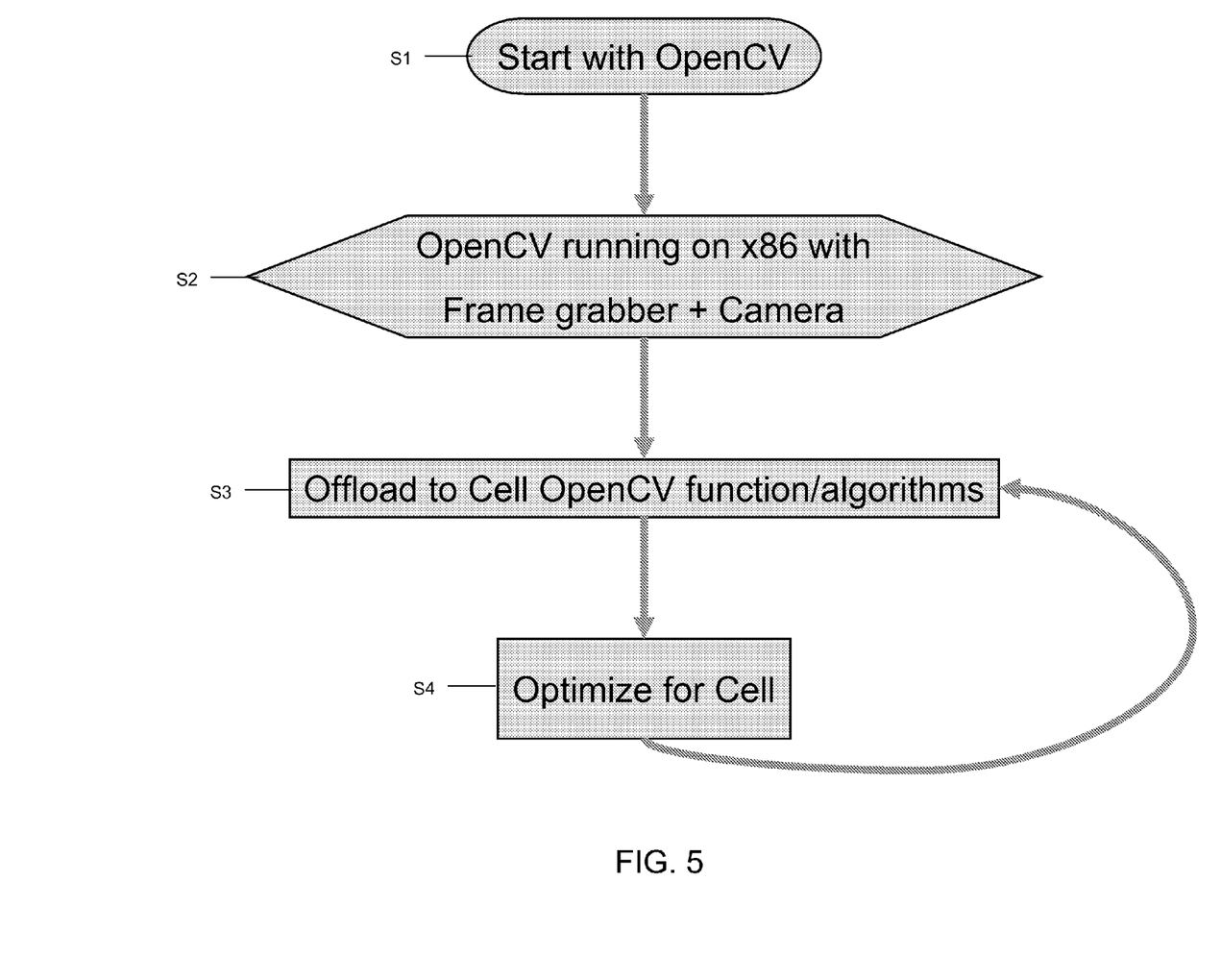
FIG. 5 shows a flow diagram for an illustrative software process according to the present invention.

Referring now to FIG. 5, a method flow diagram of an illustrative software implementation of the present invention is shown. As depicted, in step S1, the process is started with the OpenCV open source library. In step S2, OpenCV running on x86 is obtained with a frame grabber and a camera (or other image recording device). In a typical embodiment, no cell-specific optimizations are present at this point. In step S3, underlying pieces of OpenCV are offloaded to the cell (image co-processor 52) incrementally as required by necessary algorithms. In this step, information about what algorithms and APIs are required could be needed. In step S4, the off-loaded pieces are optimized, with the process repeating to step S3.

As can be seen, the present invention improves upon existing systems by providing a hybrid system comprising a management processor; a general purpose processor, a set (e.g., one or more) of special purpose engines/accelerators; a closely connected network, a staging storage device; and an archive storage device.

The present invention further provides a multi-platform hybrid system that reuses uses the existing infrastructure including the software assets for the image processing/inspection management and control system, and offloads image processing workloads to a special-purpose accelerator Further provided is a method for processing image(s), comprising: receiving a request for execution of an image co-processor of an application; and analyzing switches and routing at least a portion of library functions of the image(s)

Still yet, an image processing program product stored on a computer readable medium is provided that furnishes: a set (e.g., one or more) of libraries with selective offload of functions, algorithms, and optimizations to other systems; scalable processing system design(s) that increase and decrease processors when needed; multiple hybrid platform system design(s); and optimizations encapsulated in pluggable modules.

It should be understood that the present invention could be deployed within a computer infrastructure. This is intended to demonstrate, among other things, that the present invention could be implemented within a network environment (e.g., the Internet, a wide area network (WAN), a local area network (LAN), a virtual private network (VPN), etc.), or on a standalone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, the computer infrastructure is intended to demonstrate that some or all of the components of such an implementation could be deployed, managed, serviced, etc. by a service provider who offers to implement, deploy, and/or perform the functions of the present invention for others.

Where hardware is provided, it is understood that such any computers utilized will include standard elements such as a processing unit, a memory medium, a bus, and input/output (I/O) interfaces. Further, such computer systems can be in communication with external I/O devices/resources. In general, processing units execute computer program code, such as the software and functionality described above, which is stored in memory. While executing computer program code, the processing unit can read and/or write data to/from memory, I/O interfaces, etc. The bus provides a communication link between each of the components in a computer. External devices can comprise any device (e.g., keyboard, pointing device, display, etc.) that enable a user to interact with the computer system and/or any devices (e.g., network card, modem, etc.) that enable the computer to communicate with one or more other computing devices.

The hardware used to implement the present invention can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, the processing unit therein may comprise a single processing unit, or be distributed across one or more processing units in one or more locations, e.g., on a client and server. Similarly, the memory medium can comprise any combination of various types of data storage and/or transmission media that reside at one or more physical locations. Further, the I/O interfaces can comprise any system for exchanging information with one or more external device. Still further, it is understood that one or more additional components (e.g., system software, math co-processing unit, etc.) can be included in the hardware.

While shown and described herein as a heterogeneous image processing system and method, it is understood that the invention further provides various alternative embodiments. For example, in one embodiment, the invention provides a computer-readable/useable medium that includes computer program code to enable a computer infrastructure to heterogeneously process images. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to heterogeneously process images. In this case, the service provider can create, maintain, support, etc., a computer infrastructure, such as computer infrastructure that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for heterogeneously processing images. In this case, a computer infrastructure, such as a computer infrastructure can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A heterogeneous image processing system, comprising:
    an image co-processor comprising a plurality of distinct special purpose engines (SPEs), the image co-processor being configured to:
    receive a plurality of images collectively and substantially simultaneously recorded by a plurality of image recordation mechanisms, each image recordation mechanism providing at least one of the plurality of images for acquisition by one of a plurality of image grabbers, each image grabber sending at least one of the plurality of images to one of a plurality of peripheral component interconnects, each of the plurality of peripheral component interconnects sending at least one of the plurality of images to a pure load balancer;
    distribute distinct portions of the plurality of images across the plurality of SPEs, wherein the distinct portions are different views of an object recorded at substantially a same time by at least two of the plurality of image recordation mechanisms;
    collectively and substantially simultaneously process the distinct portions of the plurality of images at the plurality of SPEs to determine associated image data; and
    receive a selective off-load of at least one library function at a run time, wherein the at least one library function is written for a plurality of parallel multi-core processors, wherein the at least one library function supports the processing of the distinct portions of the plurality of images at the plurality of SPEs, and wherein the at least one library function is one of at least one algorithm, an optimization for a processor architecture, and a wrapper for a scripting language.

2. The heterogeneous image processing system of claim 1, further comprising a control processor being configured to receive the image data from the image co-processor, and to determine control information for the plurality of images.

3. The heterogeneous image processing system of claim 2, further comprising:
    a staging storage unit for storing the image data for use by the control processor; and
    an archive storage unit for storing at least one of the image data or the control information.

4. The heterogeneous image processing system of claim 1, further comprising an input/output (I/O) processor, the I/O processor comprising:
    a set of express peripheral component interconnects (PCIs);
    a pure load balancer (PLB) coupled to the set of express PCIs; and
    a network interface coupled to the PLB for interfacing with at least one legacy application.

5. The heterogeneous image processing system of claim 4, the I/O processor receiving the plurality of images from an image grabber, and providing the plurality of images to the image co-processor.

6. The heterogeneous image processing system of claim 1, the image co-processor further comprising:
    a power processing element (PPE); and
    an element interconnect bus (EIB) coupled to the PPE and the plurality of SPEs.

7. The heterogeneous image processing system of claim 1, the SPEs comprising accelerators that increase a rate of processing of the plurality of images.

8. The heterogeneous image processing system of claim 1, the heterogeneous image processing system being operable with multiple different computing platforms.

9. The heterogeneous image processing system of claim 1, wherein the different views comprise different angles of view.

10. The heterogeneous image processing system of claim 1, wherein the different views comprise different perspectives of view.

11. A heterogeneous image processing method, comprising:
    receiving a plurality of images in an image co-processor, the image co-processor comprising a plurality of special purpose engines (SPEs), wherein the plurality of images include images collectively and substantially simultaneously recorded by a plurality of image recordation mechanisms, each image recordation mechanism providing at least one of the plurality of images for acquisition by one of a plurality of image grabbers, each image grabber sending at least one of the plurality of images to one of a plurality of peripheral component interconnects, each of the plurality of peripheral component interconnects sending at least one of the plurality of images to a pure load balancer;
    distributing distinct portions of the plurality of images across the plurality of SPEs, wherein the distinct portions are different views of an object recorded at substantially a same time by at least two of the plurality of image recordation mechanisms;
    processing the distinct portions of the plurality of images collectively and substantially simultaneously with the plurality of SPEs to determine image data associated with the distinct portions of the plurality of images;
    providing at least one of the image data or the distinct portions of the plurality of images to a control processor to determine control information associated with the distinct portions of the plurality of images; and
    receiving a selective off-load of at least one library function at a run time, wherein the at least one library function is written for a plurality of parallel multi-core processors, wherein the at least one library function supports the processing of the distinct portions of the plurality of images at the plurality of SPEs, and wherein the at least one library function is one of at least one algorithm, an optimization for a processor architecture, and a wrapper for a scripting language.

12. The heterogeneous image processing method of claim 11, further comprising: determining, the control information with the control processor.

13. The heterogeneous image processing method of claim 12, further comprising:
    storing the image data in a staging storage unit for processing by the control processor to determine control information; and
    storing at least one of the image data or the control information in an archive storage unit.

14. The heterogeneous image processing method of claim 11, further comprising:
receiving the plurality of images in an input/output (I/O) processor, the I/O processor comprising:
a set of express peripheral component interconnects (PCIs);
a pure load balancer (PLB) coupled to the set of express PCIs; and
a network interface coupled to the PLB for interfacing with at least one legacy application.

15. The heterogeneous image processing method of claim 14, the I/O processor receiving the plurality of images from an image grabber, and providing the plurality of images to the plurality of SPEs.

16. The heterogeneous image processing method of claim 11, the image co-processor further comprising:
a power processing element (PPE); and
an element interconnect bus (EIB) coupled to the PPE and the plurality of SPEs.

17. The heterogeneous image processing method of claim 11, the plurality of SPEs comprising accelerators that increase a rate of processing of the plurality of images.

18. The heterogeneous image processing method of claim 11, further comprising receiving the plurality of images in an image grabber from at least one image recording devices.

19. A program product stored on computer readable storage medium for heterogeneously processing an image, the computer readable storage medium comprising program code for causing a computer system to:
receive a plurality of images in an image co-processor, the image co-processor comprising a plurality of special purpose engines (SPEs), wherein the plurality of images include images collectively and substantially simultaneously recorded by a plurality of image recordation mechanisms, each image recordation mechanism providing at least one of the plurality of images for acquisition by one of a plurality of image grabbers, each image grabber sending at least one of the plurality of images to one of a plurality of peripheral component interconnects, each of the plurality of peripheral component interconnects sending at least one of the plurality of images to a pure load balancer;
distribute distinct portions of the plurality of images across the plurality of SPEs, wherein the distinct portions are different views of an object recorded at substantially a same time by at least two of the plurality of image recordation mechanisms;
process the distinct portions of the plurality of images collectively and substantially simultaneously with the plurality of SPEs to determine image data associated with the plurality of images;
provide at least one of the image data or the distinct portions of the plurality of images to a control processor to determine control information associated with the distinct portions of the plurality of images; and
receive a selective off-load of at least one library function at a run time, wherein the at least one library function is written for a plurality of parallel multi-core processors, wherein the at least one library function supports the processing of the distinct portions of the plurality of images at the plurality of SPEs, and wherein the at least one library function is one of at least one algorithm, an optimization for a processor architecture, and a wrapper for a scripting language.

20. The program product of claim 19, the computer readable storage medium further comprising program code for causing the computer system to: determine control information for the plurality of images with the control processor.

21. The program product of claim 20, the computer readable storage medium further comprising program code for causing the computer system to:
store the image data in a staging storage unit for processing by the control processor; and
store the at least one of the image data or the plurality of images in an archive storage unit.

22. The program product of claim 19, the computer readable storage medium further comprising program code for causing the computer system to:
receive the plurality of images in an input/output (I/O) processor, the I/O processor comprising:
a set of express peripheral component interconnects (PCIs);
a pure load balancer (PLB) coupled to the set of express PCIs; and
a network interface coupled to the PLB for interfacing with at least one legacy application.

23. The program product of claim 22, the I/O processor receiving the plurality of images from an image grabber, and providing the plurality of images to the plurality of SPEs.

24. The program product of claim 19, the image co-processor further comprising:
a power processing element (PPE); and
an element interconnect bus (EIB) coupled to the PPE and the plurality of SPEs.

25. The program product of claim 19, the SPEs comprising accelerators that increase a rate of processing of the plurality of images.

26. The program product of claim 19, further comprising receiving the plurality of images in an image grabber from at least one image recording devices.

27. A method for deploying a system for heterogeneously processing an image, comprising:
providing a computer infrastructure being operable to:
receive a plurality of images in an image co-processor, the image co-processor comprising a plurality of special purpose engines (SPEs), wherein the plurality of images include images collectively and substantially simultaneously recorded by a plurality of image recordation mechanisms, each image recordation mechanism providing at least one of the plurality of images for acquisition by one of a plurality of image grabbers, each image grabber sending at least one of the plurality of images to one of a plurality of peripheral component interconnects, each of the plurality of peripheral component interconnects sending at least one of the plurality of images to a pure load balancer;
distribute distinct portions of the plurality of images across the plurality of SPEs, wherein the distinct portions are different views of an object recorded at substantially a same time by at least two of the plurality of image recordation mechanisms;
process the distinct portions of the plurality of images collectively and substantially simultaneously with the plurality of SPEs to determine image data associated with the distinct portions of the plurality of images; and
receive a selective off-load of at least one library function at a run time, wherein the at least one library function is written for a plurality of parallel multi-core processors, wherein the at least one library function supports the processing of the distinct portions of the plurality of images at the plurality of SPEs, and wherein the at least one library function is one of at least one algorithm, an optimization for a processor architecture, and a wrapper for a scripting language.

* * * * *